(12) United States Patent
Park

(10) Patent No.: US 10,170,808 B2
(45) Date of Patent: Jan. 1, 2019

(54) BATTERY PACK

(71) Applicant: SAMSUNG SDI CO., LTD., Yongin-si, Gyeonggi-do (KR)

(72) Inventor: Juyong Park, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 288 days.

(21) Appl. No.: 15/060,651

(22) Filed: Mar. 4, 2016

(65) Prior Publication Data

US 2016/0268656 A1    Sep. 15, 2016

(30) Foreign Application Priority Data

Mar. 10, 2015    (KR) .................. 10-2015-0033081

(51) Int. Cl.
| | |
|---|---|
| *H01M 2/10* | (2006.01) |
| *H01M 10/613* | (2014.01) |
| *H01M 10/6556* | (2014.01) |
| *H01M 10/6567* | (2014.01) |
| *H01M 10/6554* | (2014.01) |
| *H01M 10/617* | (2014.01) |
| *H01M 10/615* | (2014.01) |
| *H01M 10/625* | (2014.01) |
| *H01M 10/6557* | (2014.01) |
| *H01M 10/6555* | (2014.01) |

(52) U.S. Cl.
CPC ..... *H01M 10/6554* (2015.04); *H01M 2/1072* (2013.01); *H01M 2/1077* (2013.01); *H01M 10/613* (2015.04); *H01M 10/615* (2015.04); *H01M 10/617* (2015.04); *H01M 10/6556* (2015.04); *H01M 10/6567* (2015.04); *H01M 10/625* (2015.04); *H01M 10/6555* (2015.04); *H01M 10/6557* (2015.04); *H01M 2220/20* (2013.01)

(58) Field of Classification Search
None
See application file for complete search history.

(56) References Cited

U.S. PATENT DOCUMENTS

| | | |
|---|---|---|
| 2005/0255342 A1 | 11/2005 | Lee et al. |
| 2010/0112424 A1 | 5/2010 | Hayashi |
| 2012/0107663 A1 | 5/2012 | Burgers et al. |
| 2013/0149582 A1 | 6/2013 | Kimura et al. |
| 2013/0244068 A1 | 9/2013 | Kuroda |
| 2015/0236387 A1* | 8/2015 | Kasugai ............ H01M 10/6551 429/120 |

FOREIGN PATENT DOCUMENTS

| | | |
|---|---|---|
| DE | 10 2010 012 993 A1 | 9/2011 |
| JP | 2005-190957 A | 7/2005 |
| JP | 2008-192551 A | 8/2008 |
| JP | 2010-287514 A | 12/2010 |
| JP | 2011-222419 A | 11/2011 |
| JP | 2013-025982 A | 2/2013 |
| JP | 2013-084444 A | 5/2013 |
| JP | 2013-171746 A | 9/2013 |
| JP | 2013-196827 A | 9/2013 |
| JP | 2013-246990 A | 12/2013 |
| JP | 2014-093242 A | 5/2014 |
| KR | 10-2005-0108432 A | 11/2005 |

OTHER PUBLICATIONS

Extended European Search Report dated Jul. 27, 2016 in Corresponding European Patent Application No. 16159706.7.

* cited by examiner

*Primary Examiner* — Ladan Mohaddes

(74) *Attorney, Agent, or Firm* — Lee & Morse, P.C.

(57) ABSTRACT

A battery pack including a plate-shaped cooling plate; a plurality of battery modules, the plurality of battery modules being mounted on a top surface of the cooling plate; and at least one bracket on one lengthwise side of the cooling plate.

11 Claims, 4 Drawing Sheets

BATTERY PACK

CROSS-REFERENCE TO RELATED APPLICATION

Korean Patent Application No. 10-2015-0033081, filed on Mar. 10, 2015, in the Korean Intellectual Property Office, and entitled: "Battery Pack," is incorporated by reference herein in its entirety.

BACKGROUND

1. Field

Embodiments relate to a battery pack.

2. Description of the Related Art

In general, unlike a primary battery that cannot be recharged, a secondary battery is a battery that can be charged and discharged. According to technological development and increased production of mobile devices such as mobile phones, notebook computers, or the like, there are rapidly increasing demands for secondary batteries as energy sources. Recently, as alternative energy sources for replacing fossil fuels, secondary batteries for use in electric vehicles or hybrid vehicles are being actively researched and developed.

SUMMARY

Embodiments are directed to a battery pack.

The embodiments may be realized by providing a battery pack including a plate-shaped cooling plate; a plurality of battery modules, the plurality of battery modules being mounted on a top surface of the cooling plate; and at least one bracket on one lengthwise side of the cooling plate.

The cooling plate may further include a stopper on a bottom surface thereof at the one lengthwise side of the cooling plate.

The stopper may downwardly protrude from the bottom surface of the cooling plate and may be bent and extended to the outside of the cooling plate in a widthwise direction of the cooling plate.

The stopper and the bottom surface of the cooling plate may be on one side region of the bracket.

The one side region of the bracket may include a fixing protrusion upwardly protruding therefrom, one side of the cooling plate may include a fixing hole passing through a region between top and bottom surfaces of the cooling plate, and the fixing protrusion may be inserted into the at least one fixing hole to couple the bracket with the cooling plate.

The cooling plate and the bracket may be coupled to each other by welding a contact surface between the bottom surface of the cooling plate and a top surface of the one side region of the bracket.

The battery pack may further include at least one other bracket on another lengthwise side of the cooling plate, the other lengthwise side of the cooling plate being parallel to the one lengthwise side of the cooling plate.

The at least one bracket on the one lengthwise side of the cooling plate and the at least one other bracket on the other lengthwise side of the cooling plate may be positioned to be aligned with each other.

The battery pack may further include an external plate covering a bottom surface of the cooling plate.

The cooling plate and the at least one bracket on the cooling plate may be interposed between the plurality of battery modules and the external plate.

BRIEF DESCRIPTION OF THE DRAWINGS

Features will be apparent to those of skill in the art by describing in detail exemplary embodiments with reference to the attached drawings in which.

DETAILED DESCRIPTION

Figure 1A:
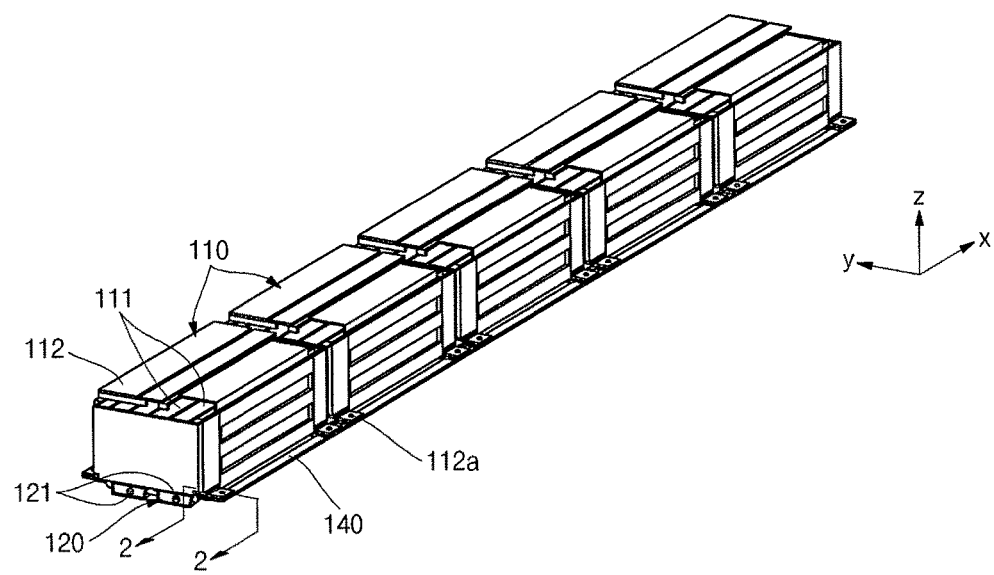
FIGS. 1A and 1B illustrate a perspective view and an exploded perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 1B:
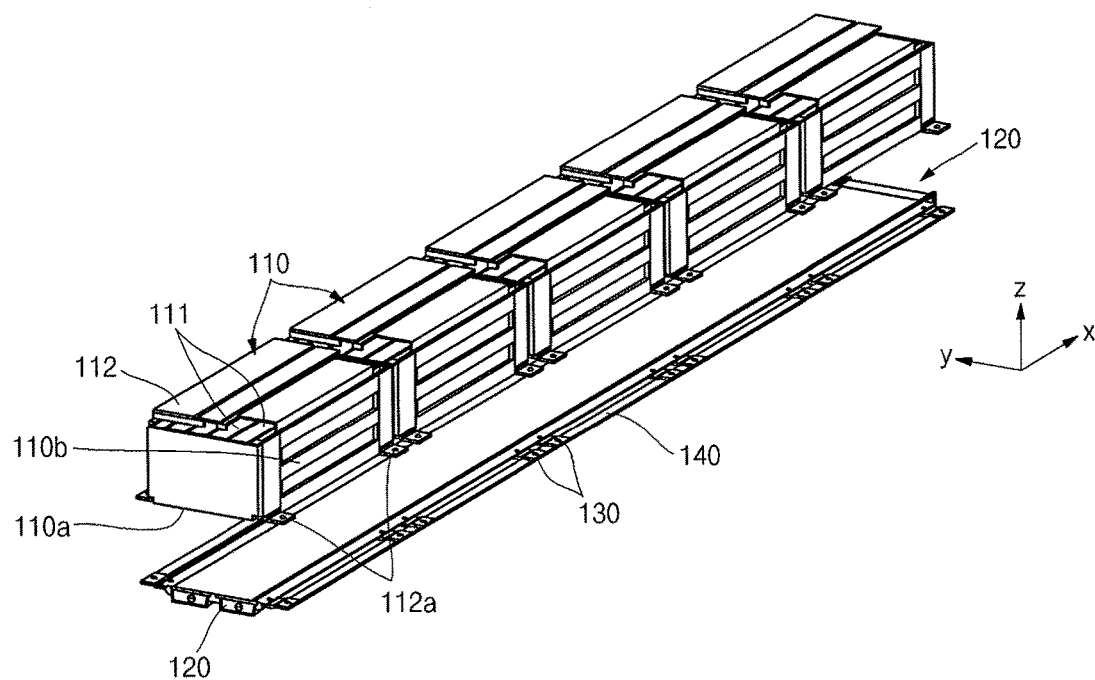
Figure 2:
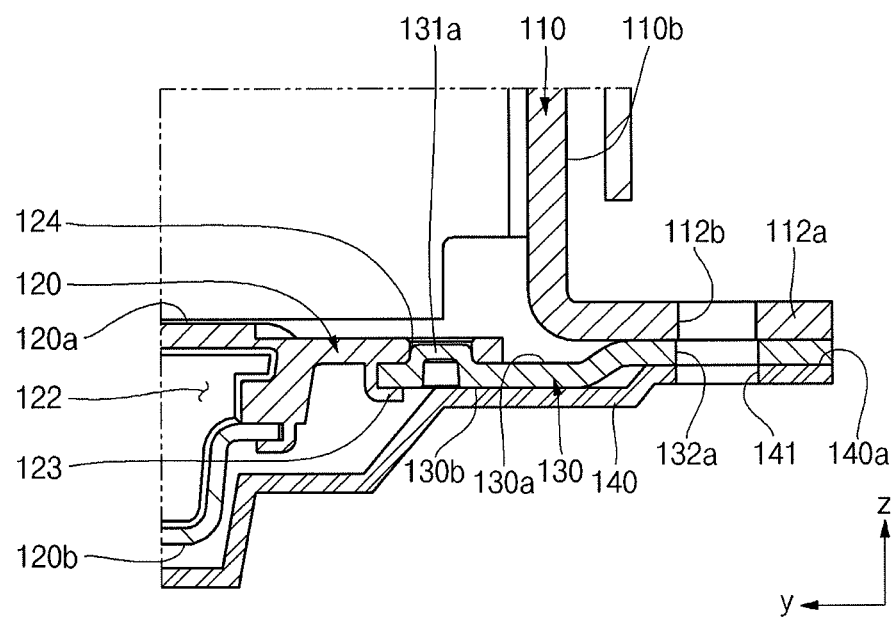
FIG. 2 illustrates a cross-sectional view taken along the line 2-2 of FIG. 1A.
Figure 3A:
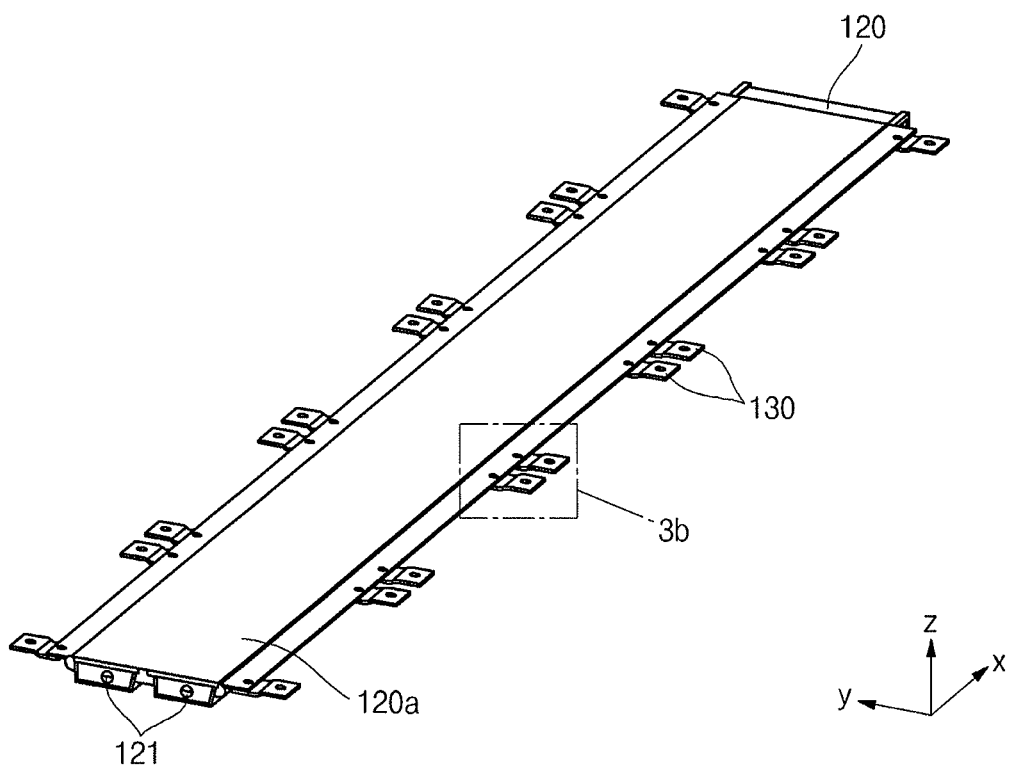
FIGS. 3A and 3B illustrate a perspective view and a partially enlarged view of a cooling plate and a bracket in the battery pack of FIG. 1A.
Figure 3B:
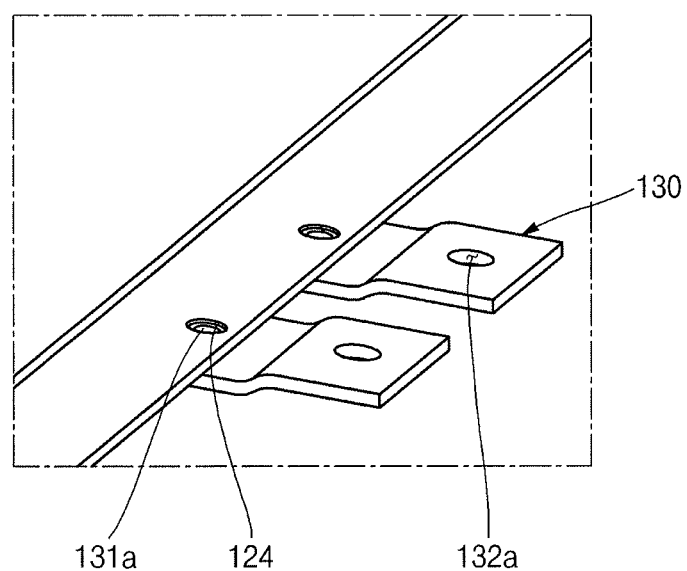
Figure 4:
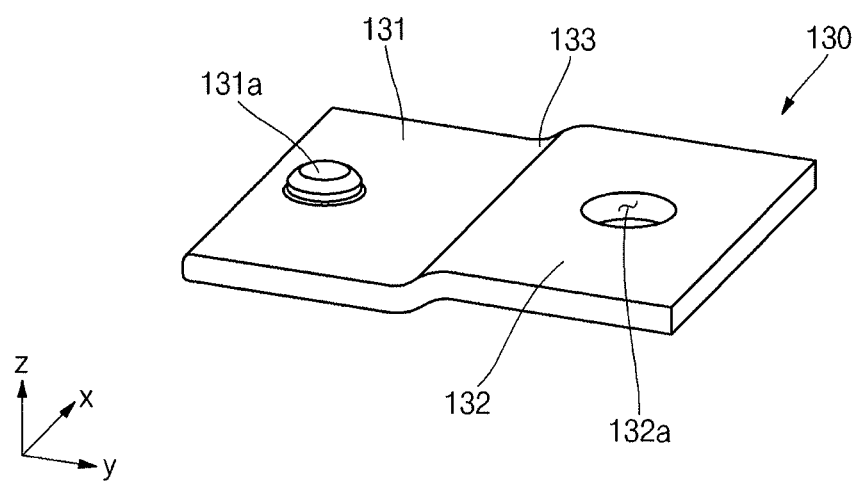
FIG. 4 illustrates an enlarged perspective view of a bracket in the battery pack of FIG. 1A.

Referring to FIGS. 1A and 1B, a perspective view and an exploded perspective view of a battery pack according to an embodiment are illustrated. Referring to FIG. 2, a cross-sectional view taken along the line 2-2 of FIG. 1A is illustrated. Referring to FIGS. 3A and 3B, a perspective view and a partially enlarged view of a cooling plate and a bracket in the battery pack of FIG. 1A are illustrated. Referring to FIG. 4, an enlarged perspective view of a bracket in the battery pack of FIG. 1A is illustrated.

Hereinafter, a battery pack 100 according to an embodiment will be described with reference to FIGS. 1A to 4.

As illustrated in FIGS. 1A to 3B, the battery pack 100 may include a plurality of battery modules 110, a plate-shaped cooling plate 120 (having a top surface 120a on which the plurality of battery modules 110 are mounted), at least one bracket 130 (on at least one side of the cooling plate 120), and an external plate 140 covering or on a bottom surface 120b of the cooling plate 120.

Each of the plurality of battery modules 110 may include a plurality of rechargeable secondary battery cells 111, a battery protection circuit to control charging and discharging of the plurality of battery cells 111, and a housing 112 to protect the plurality of battery cells 111 and the battery protection circuit. The plurality of battery modules 110 may be mounted on the top surface 120a of the cooling plate 120. The bottom surface 110b of each of the plurality of battery modules 110 may contact, e.g., may directly contact, the top surface 120a of the cooling plate 120, so that the heat generated during charging and discharging of the plurality of battery cells 111 may be cooled and/or dissipated by the cooling plate 120.

The plurality of battery modules 110 may be arranged on the top surface 120a of the cooling plate 120 in a lengthwise direction x of the cooling plate 120. In an implementation, the plurality of battery modules 110 on the top surface 120a of the cooling plate 120 may include, e.g., five, battery modules 110 arranged in a line. In an implementation, the number of battery modules 110 may vary according to a width and length of the cooling plate 120.

Each of the plurality of battery modules 110 may include fixing parts 112a protruding at opposite sides thereof in a widthwise direction y of the cooling plate 120, e.g., perpendicular to the lengthwise direction x of the cooling plate 120. The fixing parts 112a of each of the plurality of battery modules 110 may be in the form of plate-shaped protrusions protruding in parallel or coplanar with the bottom surface 110b of the battery modules 110.

In the plurality of battery modules 110, the fixing parts 112a may be provided at opposite ends of bottom corners of both lengthwise (x) sidewalls 110b of each of the plurality of battery modules 110. In an implementation, the fixing parts 112a provided at opposite ends of bottom corners of lengthwise (x) sidewalls of each of the plurality of battery modules 110 may be located to correspond to each other, e.g., may be aligned with one another with respect to central axis running in the x direction. For example, each of the plurality of battery modules 110 may include four plate-shaped fixing parts 112a (protruding in the widthwise direction y) from each of the bottom corners of both lengthwise (x) sidewalls 110b. In an implementation, each of the fixing parts 112a may include a through-hole 112b passing through a region between the top and bottom surfaces thereof.

The cooling plate 120 may be plate-shaped and may have a top surface 120a and a bottom surface 120b. For example, the cooling plate 120 may have a rectangular plate shape. For example, it may be assumed that a surface having a larger length when laterally viewed is a lengthwise (x) surface and a surface having a smaller length when laterally viewed and perpendicular to the lengthwise (x) surface is a widthwise (y) surface. The plurality of battery modules 110 may be mounted on the top surface 120a of the cooling plate 120. In an implementation, the bottom surface 120b of the cooling plate 120 may be entirely covered by the external plate 140. For example, the cooling plate 120 may be interposed between each of the plurality of battery modules 110 and the external plate 140.

The cooling plate 120 may include a coolant circulating route 122 in an internal space between the top surface 120a and the bottom surface 120b thereof. In an implementation, the cooling plate 120 may include a coolant entrance 121 on the widthwise (y) surface to introduce or discharge a coolant to or from the coolant circulating route 122. The cooling plate 120 may be made of, e.g., aluminum, and may have high heat transfer and cooling efficiency. For example, the cooling plate 120 may include a coolant circulation path therein, and a cooling medium may be provided to the coolant circulation path via a coolant inlet/outlet at an end or ends of the cooling plate 120.

The cooling plate 120 may further include stoppers 123 along both lengthwise (x) sides thereof. The stopper 123 may be provided on the bottom surface 120b of the cooling plate 120. The stopper 123 may protrude downwardly from the bottom surface 120b of the cooling plate 120 and may be bent and extended in a widthwise direction y. For example, the stoppers 123 may be provided on both lengthwise (x) sides of the cooling plate 120, and may protrude from the bottom surface 120b of the cooling plate 120 to then be outwardly bent in the widthwise direction y. The stoppers 123 may be provided at regions adjacent to both lengthwise (x) sides of the cooling plate 120. The stopper 123 may help prevent one side region 131 of the bracket 130 from moving, e.g., in a height direction z and/or the widthwise direction y of the cooling plate 120. At least one bracket 130 may be interposed between the bottom surface 120b of the cooling plate 120 and the stopper 123. For example, the stopper 123 may extend downwardly and outwardly relative to the bottom surface 120b of the cooling plate 120 such that a portion of an end of the bracket 130 is on or surrounded by the stopper 123 and the bottom surface 120b of the cooling plate 120. In an implementation, brackets 130 may be mounted along both lengthwise (x) sides of the cooling plate 120.

In an implementation, fixing holes 124 (to fix a position of the bracket 130) may further be provided in the cooling plate 120 at regions adjacent to both lengthwise (x) sides of the cooling plate 120. The fixing holes 124 may pass through the region between the top and bottom surfaces 120a and 120b of the cooling plate 120. The fixing hole 124 of the cooling plate 120 may be located to correspond to the at least one bracket 130, and a fixing protrusion 131a (on a top surface 130a of one side region 131 of the bracket 130) may be inserted into the fixing hole 124 to then fix a position of the bracket 130. The fixing hole 124 may help prevent the bracket 130 from moving in the lengthwise direction x. For example, the cooling plate 120 may fix a position of the bracket 130 with the stoppers 123 and the fixing holes 124. The cooling plate 120 may be formed in a single body through extrusion molding, e.g., may have a one-piece, integrally formed structure.

Brackets 130 may be mounted on both lengthwise (x) sides of the cooling plate 120. The bracket 130 may have a plate shape. One side region 131 of the bracket 130 may be mounted on or coupled with the cooling plate 120 and another side region 132 of the bracket 130 may be coupled with the fixing part 112a of a battery module 110.

The bracket 130 may further include a connecting part 133 connecting the one side region 131 and the other side region 132. The connecting part 133 may be bent to have or provide a step between the one side region 131 and the other side region 132. For example, the one side region 131 and the other side region 132 may be parallel to each other, and/or the connecting part 133 may create a difference in heights (in the z direction) between top and bottom surfaces of the connecting part 133. The bracket 130 may be plate-shaped, and the one side region 131, the other side region 132, and the connecting part 133 may be formed in a single body, e.g., may have a one-piece, integrally formed structure.

The one side region 131 of the bracket 130 may be interposed between the bottom surface 120b of the cooling plate 120 and the stopper 123. For example, a top surface 130a of the one side region 131 of the bracket 130 may be brought into contact with the bottom surface 120b of the cooling plate 120 and a bottom surface 130b of the one side region 131 of the bracket 130 may be brought into contact with the stopper 123. For example, a portion or end or the one side region of the bracket 130 may be on or at least partially surrounded by the stopper 123 and the bottom surface 120b of the cooling plate 120.

The one side region 131 of the bracket 130 may further include the fixing protrusion 131a upwardly protruding from the top surface 130a thereof. The fixing protrusion 131a may be shaped and sized to correspond to, complement, or fit into the fixing hole 124 of the cooling plate 120. The fixing protrusion 131a may be inserted into the fixing hole 124 of the cooling plate 120. As a result of the inserting of the fixing protrusion 131a of the bracket 130 into the fixing hole 124 of the cooling plate 120, the bracket 130 may be mounted on, coupled with, and/or otherwise fixed to the cooling plate 120. For example, the one side region 131 of the bracket 130 may be interposed between the bottom surface 120b of the cooling plate 120 and the stopper 123, and the fixing protrusion 131a may be inserted into the fixing hole 124 of the cooling plate 120 to then be fixed or coupled thereto.

The fixing hole 124 and the fixing protrusion 131a may be used to initially and/or temporarily fix the bracket 130 on the cooling plate 120. After the bracket 130 is mounted on the cooling plate 120, the bracket 130 and the cooling plate 120 may be coupled to each other by, e.g., resistance welding. For example, the top surface 130a of the one side region 131 of the bracket 130 and the bottom surface 120b of the cooling plate 120 may be brought into surface-to-surface contact with each other and coupled by welding. In an implementation, the fixing hole 124 and the fixing protrusion 131a may be engaged with each other to then initially and/or temporarily fix the bracket 130 on the cooling plate 120, and movement or changing the position of the bracket 130 before the bracket 130 is welded to the cooling plate 120 may be prevented. For example, the bracket 130 and the cooling plate 120 may be welded to each other in a state in which their positions are fixed by the stopper 123, the fixing hole 124, and the fixing protrusion 131a, and it may not be necessary to separately fix the cooling plate 120 and the bracket 130 using fixing jigs during welding. It is possible to help prevent the bracket 130 from moving or changing position prior to welding.

A through-hole 132a (passing through a region between the top surface 10a and the bottom surface 130b of the bracket 130) may be provided at the other side region 132 or end of the bracket 130. The through-hole 132a may be shaped and sized to correspond to the through-hole 112b provided in the fixing part 112 of the plurality of battery modules 110, e.g, may have the same size and shape as, and may be aligned with, the through-hole 112b of the fixing part 112. The other side region 132 of the bracket 130 may be interposed between the fixing part 112 of a battery module 110 and the external plate 140. The through-hole 132a at the other side region 132 of the bracket 130 and the through-hole 112a of each of the plurality of battery modules 110 may be positioned on the same line, e.g., may be vertically (in the z direction) aligned with one another.

The top surface 130a of the one side region 131 of the bracket 130 may be brought into contact with the bottom surface of the fixing part 112a of a battery module 110, and the bottom surface 130b of the other side region 132 of the bracket 130 may be brought into contact with a top surface of the external plate 140. For example, the bracket 130 may be mounted or provided at a region or position corresponding to a region or position of the cooling plate 120 from or at which the fixing part 112a of each of the plurality of battery modules 110 protrude.

The external plate 140 may be mounted on or may underlie the plurality of battery modules 110 to entirely cover the bottom surface 120a of the cooling plate 120, on which the bracket 130 is mounted. For example, the cooling plate 120 and the bracket 130 may be interposed between the plurality of battery modules 110 and the external plate 140. The external plate 140 may include a through-hole 141 passing through a region between the top and bottom surfaces of the external plate 140 along or at both lengthwise (x) sides. The through-hole 141 of the external plate 140 may have the same shape and size as those of the through-hole 132a provided in the other side region 132 of the bracket 130. In an implementation, the through-hole 141 of the external plate 140, the through-hole 132a of the bracket 130 and the through-hole 112b of the battery module 110 may be positioned on the same line, e.g., may be vertically aligned with one another. In an implementation, fixing members may be inserted into the through-hole 141 of the external plate 140, the through-hole 132a of the bracket 130, and the through-hole 112b of the battery module 110, thereby coupling the external plate 140, the bracket 130, and the battery module 110 to one another.

For example, the plurality of battery modules 110 and the external plate 140 mounted on the top surface 120a of the cooling plate 120 may be simultaneously coupled to each other by the fixing members inserted into the through holes 112b, 132a and 141.

By way of summation and review, a secondary battery pack of an electric vehicle or a hybrid vehicle may include a plurality of battery modules each including a plurality of secondary batteries. Such a high-capacity battery pack may include a cooling unit for cooling the batteries during charging and discharging.

The embodiments may provide a battery pack, in which a bracket and a cooling plate may be reliably and/or consistently welded without a fixing jig. For example, the bracket may be temporarily fixed at an accurate position by using a stopper and fixing holes in the cooling plate. Accordingly, an undesirable change in the position of the bracket during welding may be prevented.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
    a plate-shaped cooling plate, the plate-shaped cooling plate including a stopper on a bottom surface thereof at one lengthwise side of the plate-shaped cooling plate;
    a plurality of battery modules, the plurality of battery modules being mounted on a planar top surface of the plate-shaped cooling plate such that surfaces of the battery modules are aligned in a coplanar manner and together directly contact the planar top surface of the plate-shaped cooling plate; and
    at least one bracket on the one lengthwise side of the plate-shaped cooling plate, wherein one side of the at least one bracket is coupled with the stopper and the bottom surface of the plate-shaped cooling plate by welding,
    wherein each battery module of the plurality of battery modules includes a fixing part thereon, and
    wherein another side of the at least one bracket is coupled with the fixing part with a fixing member.

2. The battery pack as claimed in claim 1, wherein the stopper downwardly protrudes from the bottom surface of the plate-shaped cooling plate and is bent and extended to the outside of the plate-shaped cooling plate in a widthwise direction of the plate-shaped cooling plate.

3. The battery pack as claimed in claim 1, wherein the stopper and the bottom surface of the plate-shaped cooling plate at least partially surround one side region of the bracket.

4. The battery pack as claimed in claim 3, wherein:
   the one side region of the bracket includes a fixing protrusion upwardly protruding therefrom,
   one side of the plate-shaped cooling plate includes a fixing hole passing through a region between top and bottom surfaces of the plate-shaped cooling plate, and
   the fixing protrusion is inserted into the at least one fixing hole to couple the bracket with the plate-shaped cooling plate.

5. The battery pack as claimed in claim 4, wherein the plate-shaped cooling plate and the bracket are coupled to each other by welding a contact surface between the bottom surface of the plate-shaped cooling plate and a top surface of the one side region of the bracket.

6. The battery pack as claimed in claim 1, further comprising at least one other bracket on another lengthwise side of the plate-shaped cooling plate, the other lengthwise side of the plate-shaped cooling plate being parallel to the one lengthwise side of the plate-shaped cooling plate.

7. The battery pack as claimed in claim 6, wherein the at least one bracket on the one lengthwise side of the plate-shaped cooling plate and the at least one other bracket on the other lengthwise side of the plate-shaped cooling plate are positioned to be aligned with each other.

8. The battery pack as claimed in claim 1, further comprising an external plate covering the bottom surface of the plate-shaped cooling plate.

9. The battery pack as claimed in claim 8, wherein the plate-shaped cooling plate and the at least one bracket on the plate-shaped cooling plate are interposed between the plurality of battery modules and the external plate.

10. The battery pack as claimed in claim 1, wherein the one side of the bracket is parallel with and on a different plane from the other side of the bracket.

11. The battery pack as claimed in claim 8, wherein the fixing member extends through aligned through holes in the fixing part, the bracket, and the external plate.

\* \* \* \* \*